Oct. 21, 1952        S. D. DAVIES        2,614,268
SLIPPER HANGER OR RACK ATTACHMENT FOR BEDS
Filed March 27, 1950
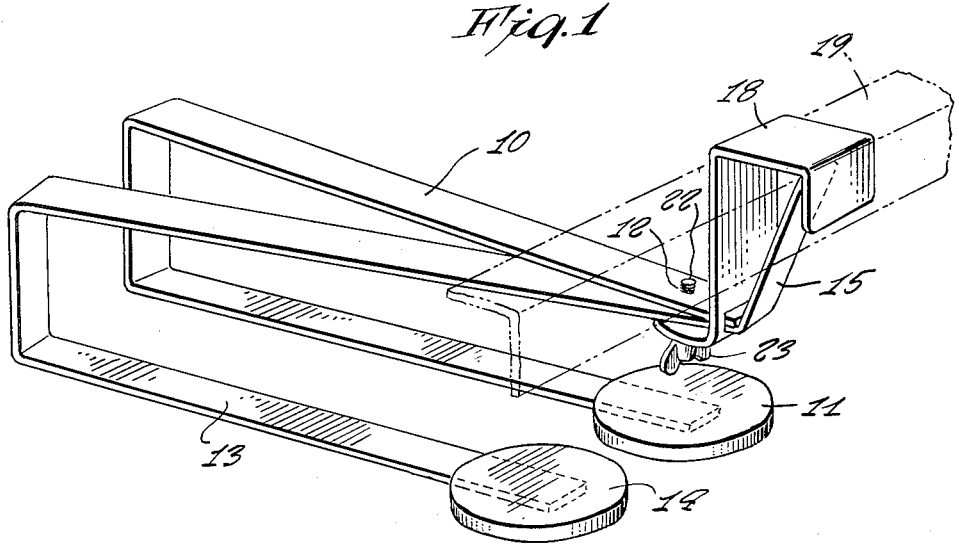
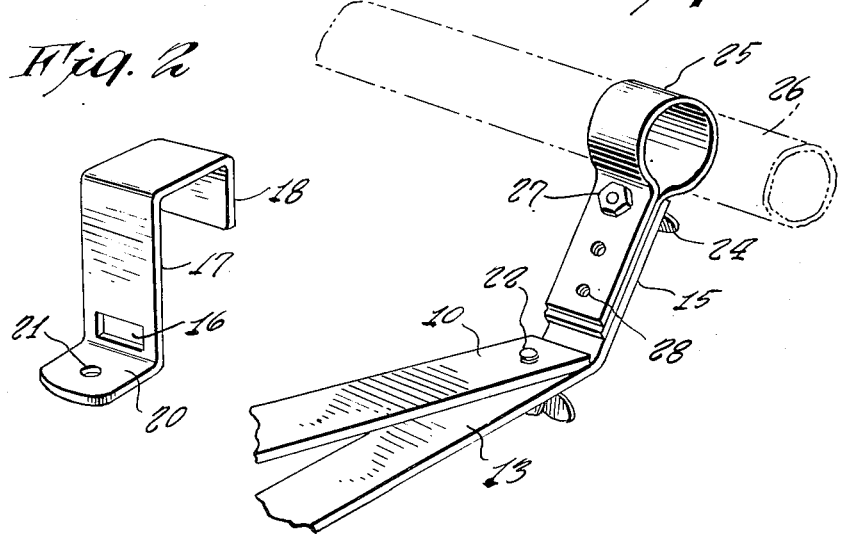
INVENTOR.
SAMUEL D. DAVIES
BY
Carl Miller
ATTORNEY Patented Oct. 21, 1952

2,614,268

UNITED STATES PATENT OFFICE 2,614,268

SLIPPER HANGER OR RACK ATTACHMENT FOR BEDS

Samuel D. Davies, Hanover, N. H.

Application March 27, 1950, Serial No. 152,236

3 Claims. (Cl. 5—317)

This invention relates to a slipper hanger or rack attachment for beds.

It is an object of the present invention to provide a slipper hanger or rack for beds whereby the slippers will always be within easy reach of the patient or occupant of the bed, can be hung under the bed and out of the way, makes sweeping and mopping under the bed easy and whereby the slippers will not be stepped on or kicked about the floor.

Other objects of the present invention are to provide an attachment for slippers which is adapted to be connected to a bed, which is of simple construction, inexpensive to manufacture, easy to install upon the bed, has a minimum number of parts, convenient to use and efficient in operation.

For other objects and for a better understanding of the invention, reference may be had to the following detailed description taken in connection with the accompanying drawing, in which Fig. 1 is a perspective view of the slipper hanger for beds embodying the features of the present invention.

Fig. 2 is a perspective view of one of the bracket parts.

Fig. 3 is a fragmentary perspective view of a modified form of connection for the parts upon the bed rod.

Referring now particularly to Figs. 1 and 2, 10 represents a U-shaped member having a supporting plate 11 on one of its legs and a threaded opening 12 in its other leg. Adjustable to the U-shaped member 10 is a second U-shaped member 13 having a supporting plate 14 and also a leg with a threaded opening and an upwardly bent end projection or lug 15. The member 13 can be adjusted out from the member 10 and its turned up end or lug 15 extends through a slot 16 in a clip 17 having a folded down upper portion or retaining lug 18 adapted to fit over a side rail 19 of a bed. The clip 17 has an inwardly bent end 20 forming a supporting lug with a hole 21 therein through which a thumb screw 22 with a wing handle 23 is extended for threaded engagement with the openings in the frames 10 and 13. The frame 10 has one of its ends also extending a short distance through the slot 16, as shown in Fig. 1.

The turned up end or lug 15 of the frame 13 passes upwardly under and fits into the inner angle of the side rail 19 of the bed. As the thumb screw 22 is tightened, the parts will be made secure upon the side rail 19.

The slippers can be extended over the supporting members 11 and 14 and thus supported above the floor and under the bed. The slippers will always be accessible to the patient or the occupant of the bed.

The arrangement is designed and intended primarily for use on hospital beds, but it should also be useful in camps or any place where metal beds or cots are used. Some of the hospital beds are made of tubular rail and accordingly a different type of attaching means is required.

A seen in Fig. 3, the members 10 and 13 are held together by the thumb screw 22, but the particular clip 17, shown in Fig. 2, is dispensed with. The turned up end 15 is provided with an opening to receive a thumb screw 24. A clamp 25 formed to surround a pipe rail 26 is closed about the pipe rail and is secured to the outwardly turned end 15 by the bolt 24 and a nut 27 secures the bolt and the parts together.

While various changes may be made in the detail construction, it shall be understood that such changes shall be within the spirit and scope of the present invention as defined by the appended claims.

Having thus set forth and disclosed the nature of my invention, what is claimed is:

1. A slipper and shoe hanger attachment for a bed, including U-shaped hanger members individually having substantially horizontal lower legs terminating in slipper and shoe supporting portions and upper legs terminating in attaching portions, means pivotally interconnecting the attaching portions to allow the legs and their slipper and shoe supporting portions to be brought together or separated by sidewise swiveling about the pivotal connection between them, and means for attaching the attaching portions to a substantially horizontal rail upon a bed.

2. A slipper and shoe hanger according to claim 1, wherein the means for attaching the attaching portions to the rail includes a clip having a bent over lug forming a suspension hook and a supporting lug having a hole therein, one end of each U-shaped hanger member upon the upper leg thereof extending through said hole and one of these ends being bent upwardly in inclined manner within the clip to clasp the rail between the inclined end and the clip, and wherein the pivotal mounting includes a pivot member extending thru the supporting lug upon the clip and both ends of the upper legs of said hanger members.

3. A slipper and shoe hanger according to claim 1, wherein the means for attaching the attaching portions to the rail includes an attachment member adapted to be mounted on said rail, an upwardly inclined lug upon one end of one upper leg of one of said hanger members co-operating with said attachment member, the other end upon the upper leg of the other hanger member being relatively short but pivoted directly to the first mentioned one end at a point spaced a short distance from the upwardly inclined portion thereof.

SAMUEL D. DAVIES.

REFERENCES CITED

The following references are of record in the file of this patent:

UNITED STATES PATENTS

| Number | Name | Date |
|---|---|---|
| 2,100,322 | Dailey | Nov. 30, 1937 |